(12) United States Patent
Binder

(10) Patent No.: US 11,021,230 B2
(45) Date of Patent: Jun. 1, 2021

(54) AIRCRAFT TURBINE ENGINE WITH A PAIR OF ROTATING AND NON-DUCTED PROPELLERS

(71) Applicant: SAFRAN AIRCRAFT ENGINES, Paris (FR)

(72) Inventor: Anthony Binder, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/420,047

(22) Filed: May 22, 2019

(65) Prior Publication Data

US 2019/0359315 A1 Nov. 28, 2019

(30) Foreign Application Priority Data

May 24, 2018 (FR) ........................ 1854403

(51) Int. Cl.
*B64C 11/00* (2006.01)
*B64C 11/48* (2006.01)
*B64C 11/30* (2006.01)
*B64C 11/28* (2006.01)

(52) U.S. Cl.
CPC ............ *B64C 11/003* (2013.01); *B64C 11/28* (2013.01); *B64C 11/308* (2013.01); *B64C 11/48* (2013.01)

(58) Field of Classification Search
CPC ....... B64C 11/003; B64C 11/48; B64C 11/28; B64C 11/308
See application file for complete search history.

(56) References Cited

U.S. PATENT DOCUMENTS

| 9,637,221 | B2 * | 5/2017 | Moore | B64C 11/48 |
| 2009/0290981 | A1 * | 11/2009 | Gandhi | B64C 27/46 416/1 |
| 2010/0150717 | A1 * | 6/2010 | Turmanidze | B64C 27/46 416/87 |
| 2011/0150645 | A1 * | 6/2011 | Moore | B64C 11/48 416/1 |
| 2011/0223020 | A1 * | 9/2011 | Lavrenko | B64C 11/003 416/1 |
| 2017/0274979 | A1 * | 9/2017 | Beckman | B64C 27/80 |
| 2018/0093754 | A1 | 4/2018 | Cheung | |

FOREIGN PATENT DOCUMENTS

| EP | 2 368 795 A2 | 9/2011 | |
| FR | 2962109 A1 | 1/2012 | |
| GB | 737175 A * | 9/1955 | ......... B64C 29/0025 |
| WO | 2008/142498 A1 | 11/2008 | |

OTHER PUBLICATIONS

Preliminary Search Report and Written Opinion dated Jan. 9, 2019, for French Application No. 1854403, filed May 24, 2018, 6 pages.

* cited by examiner

*Primary Examiner* — Woody A Lee, Jr.
(74) *Attorney, Agent, or Firm* — Christensen O'Connor Johnson Kindness PLLC

(57) ABSTRACT

An aircraft turbine engine has a pair of rotating and non-ducted propellers. An upstream propeller has an outer diameter D1 and a downstream propeller has an outer diameter D2. The engine further includes a system for varying the diameter D2. The downstream propeller includes an annular row of blades, each of which is configured to be mounted telescopically in the radial direction (R) in an outer fan duct.

8 Claims, 2 Drawing Sheets

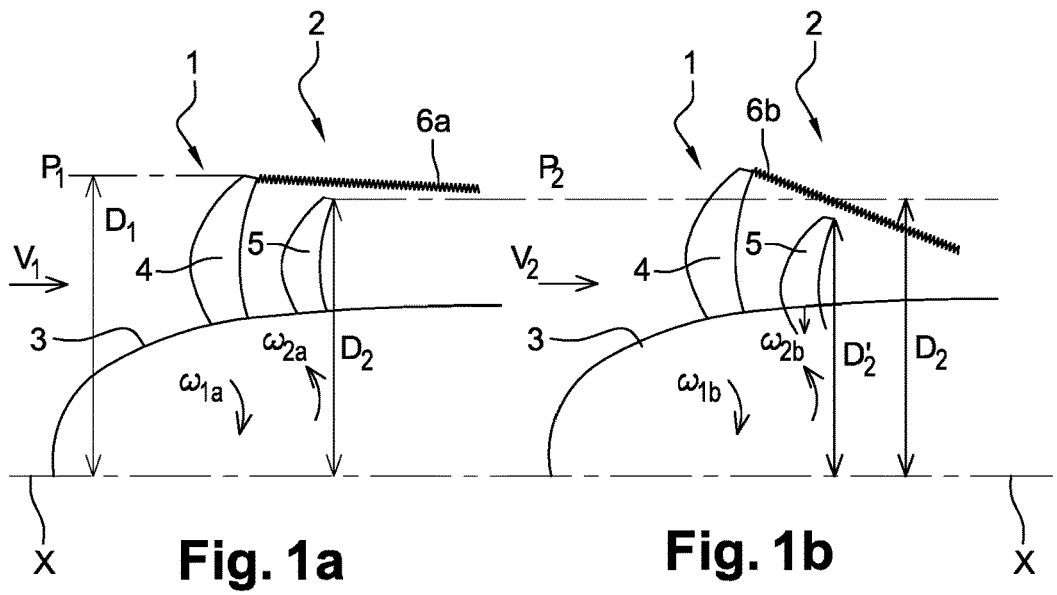
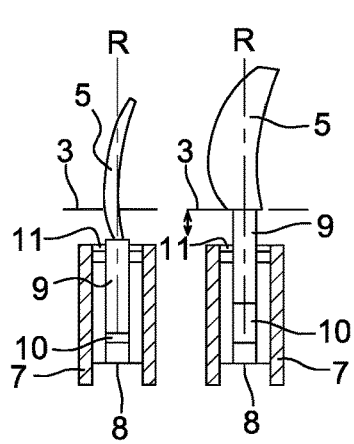
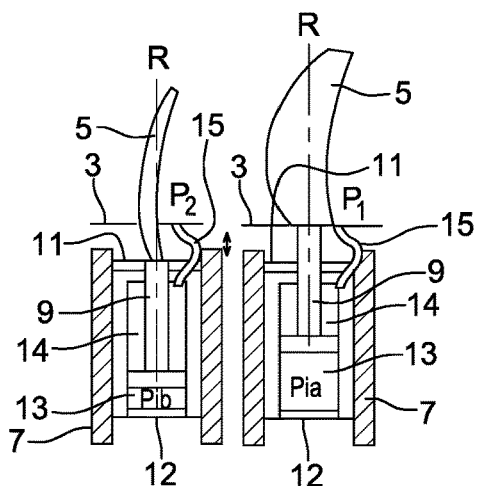
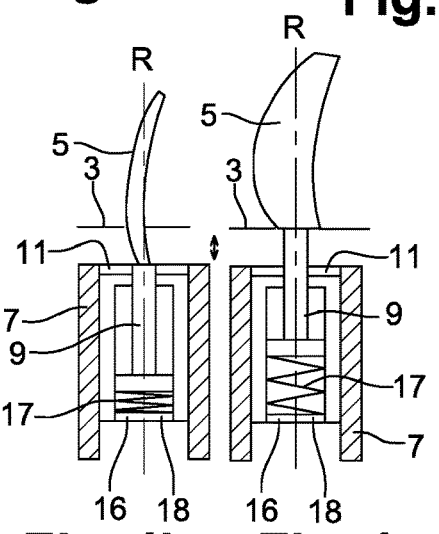
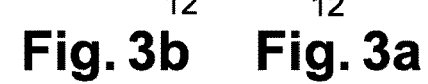

AIRCRAFT TURBINE ENGINE WITH A PAIR OF ROTATING AND NON-DUCTED PROPELLERS

TECHNICAL FIELD

The present disclosure relates to the field of aircraft turbine engines with a pair of non-ducted propellers, whether they are of the turboprop type with a double propeller or of the turbine engine type with the pair of propellers surrounding the primary flow, otherwise referred to as "Open Rotor".

BACKGROUND

In the two types of architecture, the counter-rotating propellers can have a large diameter and have the advantage of providing a significant traction by making it possible for lesser fuel consumption than with a more conventional concept.

However, the high sound levels generated by the aerodynamic interaction mechanisms between the two propellers are penalising for this type of propulsion.

One of the sources of noise comes from the interaction of vortices generated at the level of the heads of the blades of the upstream propeller with the blades of the downstream propeller. In order to reduce the noise, the downstream blade must be shorter than the upstream blade, such that the vortex passes above the downstream blade.

To optimise the efficiency of the downstream propeller by minimising the noise, there is an interest in defining a downstream blade of maximum elongation compatible with this noise constraint. For the operation in cruising flight, it is sufficient to take a diameter that is slightly less than the upstream blade to minimise the noise problems. This is disclosed, in particular in documents EP 2 368 795 A2, U.S. Pat. No. 9,637,221 B2 and US 2011/150645 of the state of the art.

However, the higher the load of the blade, the more the flow contracts and the more the vortex approaches the axis behind the upstream propeller. The take-off point corresponds to a case of a high load and, in addition, it is constraining for the noise standards to be complied with.

There is therefore a need to overcome the contradiction between the fact that it is desired to increase as much as possible the elongation of the blades of the downstream propeller to improve the efficiency at cruising speed and the fact that it is necessary to reduce the noise in take-off conditions.

In document FR-A1-2962109, the applicant had proposed a solution wherein the blades of the downstream propeller can be folded towards the rear, in particular at the time of take-off to pass inside the end vortices of the blades of the upstream propeller. However, this solution modifies the profile of the blades as seen by the flow and degrades performance, while take-off requires greater thrust from the engine.

The invention has the aim of proposing an alternative for optimising the efficiency of the propellers at the various flight conditions while minimising the noise generated, in particular at the time of take-off.

SUMMARY

The invention relates to an aircraft turbine engine with a pair of rotating and non-ducted propellers, comprising an upstream propeller having an outer diameter D1 and a downstream propeller having an outer diameter D2, said downstream propeller comprising means for varying said diameter D2, said downstream propeller comprising an annular row of blades which are each configured to be mounted telescopically in the radial direction (R) in an outer fan duct, each blade being secured to a substantially radial shaft which is connected to means for actuating for the radial translation of the blade or even also the angular pitch thereof about the axis radial (R) thereof, the means for actuating comprising at least one actuator associated with one or more blades, characterised in that the or each actuator is pneumatic and more preferably configured to be activated according to an ambient pressure.

By telescopically moving the blades of the downstream propeller, the profile of the blades remains the same as that that was defined at the start to optimise the action of the propeller in the flow. In addition, it is possible to control the pitch of the blades. This solution therefore makes it possible to decrease the diameter of the downstream propeller to pass under the tip vortices of the upstream propeller while still remaining as close as possible to the aerodynamic optimisation of the blades.

In certain embodiments, the actuation means comprise one actuator per blade, mounted on the radial shaft of said blade.

Said actuator can comprise elastic means arranged to exert a return force on the blades opposite the centrifugal force exerted on the latter.

In other embodiments, the means for actuating comprise at least one actuator associated with several blades.

In this case, a transmission ring rotating with the downstream propeller, mechanically connected to several blades, can be moved in axial translation by said actuator.

Also, each actuator can be pneumatic and preferably configured to be activated according to an ambient pressure.

Advantageously, the actuation means transmit to the radial shaft secured to the blade a radial translation and complementary means use said translation to rotate the blade about the axis thereof on the hub, with the purpose of associating a modification of the pitch of the blade with the radial movement thereof.

In yet another embodiment, the actuation means comprise a swashplate with undulations, perpendicular to said shaft and connected to the latter by pivoting connecting rods, so as to modify the radial position of said shaft during a rotation around said radial direction. This device directly associates a rotation of the shaft to adjust the pitch of the blade to a radial translation of the blade, thanks to the undulations of the swashplate.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1a is a schematic view of an axial half cross-section of a pair of rotating propellers mounted on the upstream portion of an engine for cruising flight conditions;

FIG. 1b is a schematic view of an axial half cross-section of the pair of rotating propellers shown in FIG. 1a with the engine in a take-off phase;

FIG. 2a is a schematic view of a first embodiment of a blade of the downstream propeller shown in FIG. 1a, with the actuation system thereof, in cruising flight conditions;

FIG. 2b is a schematic view of the blade shown in FIG. 2a, with the actuation system thereof, in take-off phase conditions;

FIG. 3a is a schematic view of a second embodiment of a blade of the downstream propeller shown in FIG. 1a, with the actuation system thereof, in cruising flight conditions;

FIG. 3b is a schematic view of the blade of the downstream propeller shown in FIG. 3a, with the actuation system thereof, in take-off phase conditions;

FIG. 4a is a schematic view of a third embodiment of a blade of the downstream propeller shown in FIG. 1a, with the actuation system thereof, in cruising flight conditions;

FIG. 4b is a schematic view of the blade of the downstream propeller shown in FIG. 4a, with the actuation system thereof, in take-off phase conditions;

Figures 5A, 5B:
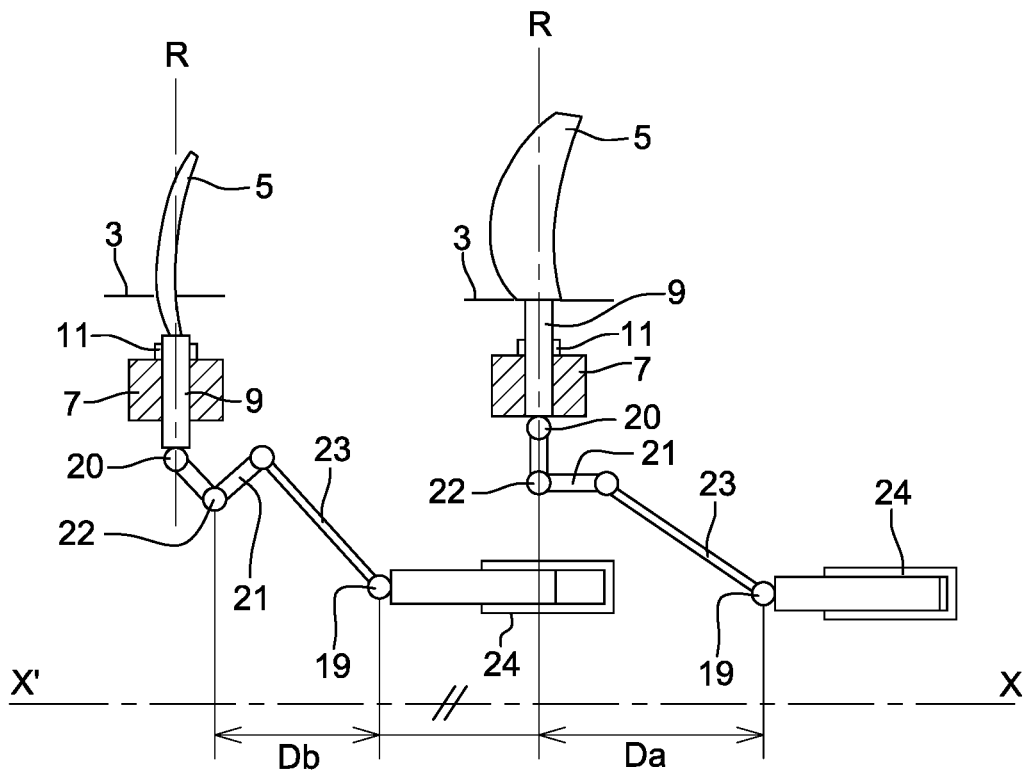
FIG. 5a is a schematic view of a fourth embodiment of a blade of the downstream propeller shown in FIG. 1a, with the actuation system thereof, in cruising flight conditions.
FIG. 5b is a schematic view of the blade of the downstream propeller shown in FIG. 5a, with the actuation system thereof, in take-off phase conditions.

Elements that have the same functions in the various embodiments of the invention are marked with the same references in the figures.

DETAILED DESCRIPTION

While illustrative embodiments have been illustrated and described, it will be appreciated that various changes can be made therein without departing from the spirit and scope of the invention.

FIGS. 1a and 1b schematically represent an aircraft turbine engine with an upstream propeller 1 rotating in one direction with respect to an engine axis X and a downstream propeller 2 rotating in the opposite direction about the same engine axis. The blades 4, 5, of the two propellers rotate about an outer fan duct 3 and are placed here upstream of the engine portion of the turbine engine, which is not represented. This is, for example, a turboprop of which the air intake is placed downstream of the pair of counter-rotating and axially offset propellers.

In FIG. 1a, the turbine engine is in a cruising flight configuration for the aircraft. The axial speed V1 of movement in the incident flow on the propellers is important. The rotation speed ω1a of the upstream propeller 1 and the rotation speed ω2a of the downstream propeller 2 have important values, adapted to the movement speed V1. Moreover, the pitch angles of the blades 4, 5, of the two propellers 1, 2, have determined values, adapted during the design of the turbine engine, to optimise the efficiency thereof according to the load of the blades 4, 5, to the given cruising speed V1. The upstream propeller 1 has a determined and fixed outer diameter D1.

Under these cruising flight conditions, the blades 4 of the upstream propeller 1 create a tip vortex 6a that winds around, helically starting from the outer radial end thereof. Given the load of the blades 4 of the upstream propeller 1, the winding of the tip vortices 6a is contracted somewhat about the axis X. However, as represented on FIG. 1a, the outer diameter D2 of the downstream propeller 2 is defined such that the outer radial end of the blades 5 thereof passes radially inside the winding of the tip vortices 6a of the blades 4 of the upstream propeller 1, thus limiting the interactions.

It will also be noted, that, in general, the cruising flight of an aircraft is carried out at a given altitude which is relatively high, therefore the static ambient pressure P1 around the outer fan duct 3 is relatively low.

In FIG. 1b, the turbine engine is in a take-off configuration for the aircraft. Under these conditions, the movement speed V2 in the incident flow on the propellers 1, 2, is relatively low. It will be noted that, however, with the aircraft being close to the ground, the ambient static pressure P2 is stronger. The thrust that the propellers 1, 2, must exert is significant but, given the operating conditions, the speed of rotation ω1b, ω2b, of each one of the two propellers 1, 2 is lower than in cruising flight. Advantageously also, the pitch angles of the blades of the two propellers are greater, in order to obtain the desired thrust.

Under these operating conditions, the winding of the tip vortices 6b of the blades 4 of the upstream propeller 1 contracts more than in cruising flight and here passes inside the disc of diameter D2 of the downstream propeller 2 when it is configured for cruising flight.

According to the invention, as indicated in FIG. 1b, the blades 5 of the downstream propeller 2 are radially retracted during take-off, with an outer diameter D'2 less than the diameter D2 in cruising flight, so as to radially pass under the tip vortices 6b of the blades 4 of the upstream propeller 1.

According to a first embodiment of the invention, in reference to FIGS. 2a and 2b, each blade 5 of the downstream propeller 2 is connected by a hydraulic cylinder 8 to the hub 7 of the propeller 2 which drives it in rotation. Here, a radial shaft 9, secured to the blade root 5, forms at the opposite end thereof, the piston of the hydraulic cylinder 8. The actuation means not represented control the quantity of liquid in the chamber 10 of the cylinder 8 to move the shaft 9, therefore the blade 5, in translation according to the radial axis R of the shaft 9. Advantageously, means 11 placed between the radial shaft 9 and the hub 7 are configured so as to rotate the radial shaft 9 about the axis R thereof according to the radial movement thereof and, thus, modify the pitch of the blade 5, as shown by the comparison between FIGS. 2a and 2b. This can be, for example, a system of helical bearings of which the pitch determines the pitch law of the blade 5 according to the position thereof along the radial direction R.

In FIG. 2a, the blade 5 of the downstream propeller 2 is in a nominal position for the cruising flight. The shaft 9 is therefore radially translated outwards by the hydraulic cylinder 8 and the pitch angle is low.

In FIG. 2b, the blade 5 of the downstream propeller 2 is radially entered for the take-off conditions. The shaft 9 is therefore radially recalled inwards by the hydraulic cylinder 8. Moreover, the interaction with the means 11 for adjusting the pitch caused the shaft 9 to pivot during the movement thereof and the pitch angle of the blade 5 is greater.

According to a second embodiment, in reference to FIGS. 3a and 3b, each blade 5 of the downstream propeller 2 is connected by a pneumatic cylinder 12 to the hub 7 of the propeller 2 that drives it in rotation. A radial shaft 9, secured to the blade root 5 forms at the opposite end thereof, a piston that sealingly separates two chambers 13, 14 from the pneumatic cylinder 12. The radially inner chamber 13 is closed. The pressure of the gas in the radially inner chamber 13 therefore increases when the shaft 9 is translated radially inwards and decreases when the shaft 9 rises radially outwards.

The radially outer chamber 14 is connected by a duct 15 with outer flow on the outer fan duct 3. The pressure of the air in the radially outer chamber 14 is therefore independent of the position of the shaft 9 but is controlled by the external pressure around the outer fan duct 3.

The pressure exerted radially outwards on the piston of the cylinder 12 by the pressure of the gas in the inner chamber 13 must balance a force resulting from the forces of inertia and aerodynamic forces on the blade 5 in rotation, oriented radially outwards, and from the pressure exerted radially inwards by the ambient air pressure on the side of the outer chamber 14. In reference to FIGS. 3a and 3b, this resulting force, oriented radially inwards, has an intensity that is not as strong in cruising flight than in the take-off phase, the external pressure P1 being less. The volume of the inner chamber 13 must therefore be greater such that the pressure Pia of the gas therein is lower than the pressure Pib during the take-off phase. Therefore, the blade 5 is radially positioned more outwards in cruising flight than in the take-off phase.

The cross-section of the piston in the cylinder 12 and the pressure of the gas in the radially inner chamber 13 are configured at mounting such that the radial positions of the blade 5 in cruising flight and at take-off correspond to those desired, as indicated in FIGS. 3a and 3b. In particular, a pressure Pib of the gas must be imposed in the radially inner chamber 13 that is lower than the ambient pressure P2 on the ground in order to recall the blade 5 towards the axis and counter the forces of inertia during the take-off phase.

Advantageously, the device is equipped with the same means 11 as the first embodiment to modify the pitch of the blade according to the radial movement of the shaft 9 linked to the piston of the cylinder 12.

According to a third embodiment, in reference to FIGS. 4a and 4b, each blade 5 of the downstream propeller 2 is connected by a cylinder 16 with elastic means 17 to the hub 7 of the propeller 2 that drives it in rotation. A radial shaft 9, secured to the blade root 5 forms, at the opposite end thereof, a sliding piston in the cylinder 16. Here, the cylinder guides the radial translation of the shaft 9, but the piston is not subjected to the aerodynamic and inertia forces on the blade 5 transmitted by the shaft 9 and to the action of the elastic means 17. In the example, the elastic means are formed by a helical spring 17 which, being fixed to the radially internal bottom 18 of the cylinder 16, works in tension to counter the resulting radial forces of inertia and the aerodynamic forces on the blade 5 of the downstream propeller 2. In FIG. 4a, this resulting radial force being stronger in pressure P1 and speed V1 conditions in cruising flight, the blade 5 is radially out with the nominal scope thereof, while, in FIG. 4b, the resulting radial force being lower, the spring 17 causes the blade 5 to radially enter in the outer fan duct 3.

Advantageously, the device is provided with the same means 11 as the first embodiment to modify the pitch of the blade 5 according to the radial movement of the shaft 9 linked to the piston.

According to a fourth embodiment, an axial control ring 19 is connected to all of the blades of the downstream propeller 2, a single one 5 being represented in the FIGS. 5a, 5b.

Each blade 5 is, as hereinabove fixed to a radial shaft 9, but the shaft is here simply guided in translation along the radial axis R thereof by the hub 7 of the propeller 2, which drives the blade 5 in rotation about the engine axis X.

The radial shaft 9 is articulated as a pivot 20 on a lever 21, said pivot 20 having an axis parallel to the tangential direction. Here, the lever 21 has the form of a bracket and it is guided with respect to the hub 7 by a pivot connection 22 at the top of the bracket. The control ring 19, placed here downstream of the blades 5, is connected to the lever 21 by a connecting rod 23. The control ring 19 is moved in translation along the axis X of the engine by an actuator 24, in rotation with the downstream propeller 2. In the example, the actuator 24 is a hydraulic cylinder as in the first embodiment. It could also be a pneumatic cylinder as in the second embodiment.

In FIG. 5a, in cruising flight, the cylinder 24 separates the control ring 19 from the axis R of the radial shaft 9 of the blade 5, and places the ring 19 at a distance Da from the pivot connection 22 at the top of the lever 21 as a bracket. Here, this corresponds to the position of the blade 5 of the downstream propeller 2 outside the outer fan duct 3 in nominal position for the cruising flight.

In FIG. 5b, in the take-off phase, the cylinder 24 pushes back the control ring towards the central pivot 22 of the lever 21, at a distance Db from the latter less than Da. Given the bracket shape of the lever 21, the connecting rod 23 causes the blade 5 of the downstream propeller to radially enter the outer fan duct 3 at the desired position to prevent the tip vortices.

Advantageously, the device is provided with the same means 11 as the first embodiment to modify the pitch of the blade according to the radial movement of the shaft 9 linked to the blade 5.

Figures 6A, 6B, 6C:
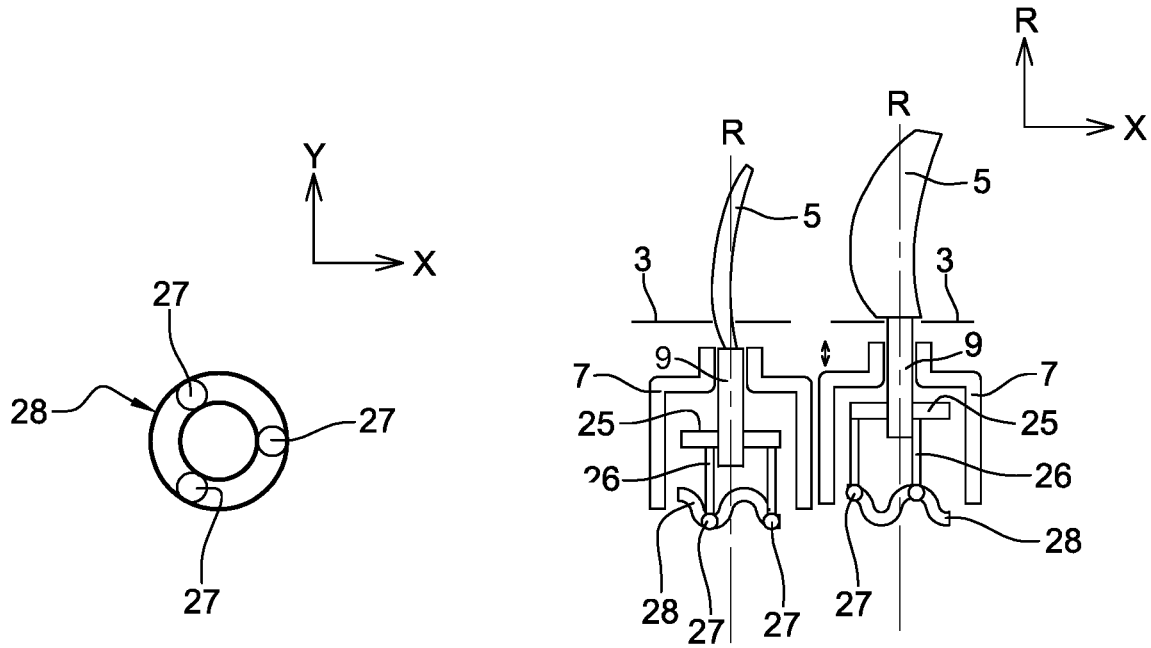
FIG. 6a is a schematic view of a fifth embodiment of a blade of the downstream propeller shown in FIG. 1a, with the actuation system thereof, in cruising flight conditions.
FIG. 6b is a schematic view of the blade of the downstream propeller shown in FIG. 6a, with the actuation system thereof, in take-off phase conditions.
FIG. 6c shows a top view along a radial direction of a guide of the shown in FIGS. 6a and 6b.

According to a fifth embodiment, in reference to FIGS. 6a, 6b and 6c, the radial shaft 9 connected to the root of each blade 5 is mounted freely in rotation and radial translation in the hub 7 of the propeller 2. An actuator not represented, for example an electric motor rotates the radial shaft 9 about the radial axis R thereof and angularly positions it on demand. The radial shaft 9 comprises a transverse plate 25 that here supports three radial connecting rods 26 regularly distributed circumferentially about the radial axis R of rotation (only two are represented in FIGS. 6a and 6b). The tie-rods 26 are slidably mounted by pivot connections 27 on a guide 28. As illustrated in FIG. 6c, the guide 28 presents itself as a swashplate having a circular shape perpendicular to the radial axis R, to follow the position of the tie-rods 26 in the rotation of the shaft 9. However, such as illustrated on FIGS. 6a and 6b, the swashplate 28 has three undulations in the radial direction R, circumferentially spaced, like the tie-rods 26. The amplitude of the undulations in the radial direction R corresponds to that of the radial movement of the blades 5 between the cruising flight and the take-off phase. The angular extension of the undulations corresponds to the variation in the pitch angle between the two flight conditions, typically around 30°. In reference to FIG. 6a, when the actuator angularly positions the radial shaft 9 in a first position, the tie-rods 26 are at the tops of the undulations and the blade 5 is out for cruising flight conditions with a first value of the pitch angle. However, in FIG. 6b, when the actuator rotates the radial shaft 9 to obtain the pitch angle suited for the take-off phase, the tie-rods 26 are in the troughs of the undulations, entering the blade 5 radially in the outer fan duct 3. This fifth embodiment directly couples the adjustment in radial position and the pitch.

The invention has been presented for a turbine engine of the turboprop type but it can be applied without any principle modification to a turbine engine of the turbojet type, wherein the engine compartment is placed in the axis of the pair of counter-rotating propellers, downstream or upstream of the latter.

The embodiments of the invention in which an exclusive property or privilege is claimed are defined as follows:

1. An aircraft turbine engine, comprising:
    a pair of rotating non-ducted propellers, wherein one of the propellers is an upstream propeller having a first outer diameter D1, and the other propeller is a downstream propeller having a second outer diameter D2, the downstream propeller comprising means for varying said diameter D2, said downstream propeller comprising an annular row of blades, each blade being configured to be mounted telescopically in the radial direction (R) in an outer fan duct,
    each blade being secured to a radial shaft that is connected to actuation means for the radial translation of the blade, the actuation means comprising at least one actuator associated with one or several blades, wherein each of the at least one actuator comprises a pneumatic cylinder comprising a radially closed inner chamber and a radially outer chamber connected by a duct with outer flow on the outer fan duct.

2. The aircraft turbine engine according to claim 1, wherein each blade is associated with one of the at least one actuator, with each actuator being mounted on the radial shaft of said each blade.

3. The aircraft turbine engine according to claim 1, wherein several blades are associated with the one of the at least one actuator.

4. The aircraft turbine engine according to claim 3, wherein a transmission ring rotating with the downstream propeller, mechanically connected to several blades, is moved in axial translation by said at least one actuator.

5. The aircraft turbine engine according to claim 1, wherein the actuation means is configured to selectively control an angular pitch of each blade about a radial axis (R) thereof.

6. The aircraft turbine engine according to one of claim 5, wherein the actuation means comprise complementary means and wherein the actuation means transmit to the radial shaft secured to the blade, a radial translation and the complementary means use said translation to rotate the shaft about the axis (R) thereof on the hub, with the purpose of associating a modification of the pitch of the blade with the radial movement thereof.

7. The aircraft turbine engine according to claim 1, wherein each actuator is configured to be activated according to an ambient pressure.

8. An aircraft turbine engine, comprising:
    a pair of rotating non-ducted propellers, wherein one of the propellers is an upstream propeller having a first outer diameter D1, and the other propeller is a downstream propeller having a second outer diameter D2, the downstream propeller comprising means for varying said diameter D2, said downstream propeller comprising an annular row of blades, each blade being configured to be mounted telescopically in the radial direction (R) in an outer fan duct,
    each blade being secured to a radial shaft that is connected to actuation means comprising actuators for the radial translation of the blade, wherein each blade is associated with an actuator, each actuator being mounted on the radial shaft of said each blade, the actuation means further comprising a swashplate with undulations, perpendicular to said shaft and connected to the latter by rods with a pivoting connection to modify the radial position of said shaft during a rotation around said radial direction (R).

* * * * *